United States Patent [19]
Lewis et al.

[11] 3,858,844
[45] Jan. 7, 1975

[54] NUCLEAR TURBINE STEAM BYPASS DUMP VALVE

[75] Inventors: Ivor J. Lewis, Springfield; Thomas H. McCloskey, Aston, both of Pa.

[73] Assignee: Westinghouse Electric Corporation, Pittsburgh, Pa.

[22] Filed: May 18, 1973

[21] Appl. No.: 361,736

[52] U.S. Cl. .................. 251/28, 251/33, 251/44
[51] Int. Cl. ................................. F16k 31/383
[58] Field of Search ................... 251/44, 33, 28

[56] References Cited
UNITED STATES PATENTS
| | | | |
|---|---|---|---|
| 513,106 | 1/1894 | Hayden | 251/44 X |
| 3,684,236 | 8/1972 | Lewis | 251/28 |

*Primary Examiner*—Arnold Rosenthal
*Attorney, Agent, or Firm*—G. H. Telfer

[57] ABSTRACT

A fast opening valve for a pressurized fluid line. The valve comprises a body member having an inlet port and an outlet port therein, and a main plug member movably disposed within said body member. An overbalance chamber is defined by the main plug member and the interior of the body member. The overbalance chamber communicates with a dump line through a draining orifice and also communicates with the inlet port when the valve is closed. A pilot plug blocks the draining orifice and isolates the overbalance chamber from the dump line when the valve is closed. The main plug is held in the closed position against the force of a spring bias by a pressurized piston-cylinder arrangement. With the pilot plug blocking the draining orifice, the pressurized fluid collecting in the overbalance chamber exerts a force which assists in holding the valve closed. The valve is opened by a predetermined signal which contemporaneously releases the pressure force holding the main valve plug. The predetermined signal also opens the draining orifice. With the holding force relieved and the pressurized fluid drained from the overbalance chamber, the spring bias impels the main plug to the open position. A hydraulic damper absorbs high impact energies associated with the opening valve.

10 Claims, 5 Drawing Figures

NUCLEAR TURBINE STEAM BYPASS DUMP VALVE

BACKGROUND OF THE INVENTION

1. Field of the Invention

This invention relates to a nuclear steam turbine system and in particular to a fast opening, low friction, steam bypass valve utilized in the nuclear steam turbine system.

2. Description of the Prior Art

A conventional reheat steam turbine power plant comprises a steam generator, a high pressure turbine, a reheater, and a low pressure turbine. In the conventional power plant, steam from the steam generator to the high pressure turbine is controlled by a main control valve. The high pressure turbine and the low pressure turbine are mechanically linked to an electrical generator which provides electrical energy to an associated electrical load.

The main control valve is moved by appropriate governors to a closed position whenever the turbine reaches a predetermined overspeed condition. The overspeed condition may be caused by a variety of malfunctions in the system, such as sudden loss of load in the generator electrical system or a failure of a component in the steam supply system.

The sudden closing of the main control valve results in the entrapment of a substantial mass of steam at high pressure and temperature in the high pressure turbine elements, the reheater, and in the interconnecting conduits therebetween. If this trapped mass of steam is permitted to expand through the low pressure turbine elements, the energy stored in the entrapped steam will be translated into rotational energy and tend to aggravate the overspeed condition. Aggravation of the overspeed condition will induce mechanical stresses on the blading of the turbine elements which, if left unchecked, would make premature failure of the turbine components likely.

In order to avoid the deleterious effects of excessive turbine overspeed, it is imperative that the steam trapped in the high pressure turbine elements be afforded an escape route around the low pressure elements rather than be permitted to expand through the low pressure turbine elements.

In the prior art, one method of evacuating the steam trapped in the system after closing of the main control valve is to provide a bypass route from the outlet side of the high pressure turbine or from the reheater outlet directly to the condenser.

A bypass valve is usually provided in the bypass route to prevent steam from bypassing the low pressure elements during normal turbine operation. However, the bypass valve must be predictably controllable so that the valve will respond within a predetermined time period to an overspeed trip signal. The quick-opening reaction characteristic of the valve is essential for obtaining the most advantageous use of the bypass route.

Since steam trapped in the system will expand rapidly through the low pressure elements if the bypass valve operation is not quickly responsive to the trip signal, a quick-opening valve response is essential to a successful bypass system. Provision of a bypass valve having a controlled, quick-opening response characteristic will enhance the efficiency of the bypass function, with a concomitant limitation of the overspeed condition.

The valve utilized by the prior art with the temperature and pressures therein involved is not readily applicable for use in a nuclear steam turbine system. Since the nuclear steam turbine system utilizes greater volumes of steam to achieve higher temperature and pressure conditions, quick-opening response of a necessarily more massive bypass valve is especially essential. However, valves having the physical capacity required for use in the nuclear steam turbine system, and having, at the same time, the quick-opening response characteristic required by the bypass function, are also susceptible to fluttering due to cyclic force influences of the draining fluid or produce excessive impact forces due to high opening velocity. As a result, a valve for use in a nuclear steam turbine system must be quick-acting, overcome cyclic effects and high impact velocities, yet be predictably controllable.

SUMMARY OF THE INVENTION

The invention discloses an improved valve device for use in a pressurized fluid line. The valve is capable of quickly opening from normally closed to a wide open position, and is also capable of diverting a large volume of steam in a fully controlled manner in response to a predetermined signal.

The valve is a positive sealing, low friction device comprising a body member having an inlet port and an outlet port therein, and a main plug member movable from a closed to an open position disposed within the body member. The main plug member in the closed position prevents communication between the inlet port and the outlet port.

An overbalance chamber is defined by the main plug member and the interior of the body member. The overbalance chamber communicates with a steam dump line through a draining orifice. The overbalance chamber also communicates with the inlet port through a narrow clearance space defined by the main plug member and the interior side-walls of the body member when the main valve plug is closed.

A pilot plug blocks the draining orifice and isolates the overbalance chamber from the steam dump line when the main valve plug is closed. The main valve plug is held in the closed position against the force of a spring bias by first pressure-responsive bias means. The pilot plug responds to pressure-responsive means to seal the draining orifice thereby permitting the pressurized fluid from the inlet port to collect in the overbalance chamber. The pressurized fluid build-up in the overbalance chamber exerts an additional force to assist the first pressure responsive bias means in holding the main valve plug closed.

The valve is tripped open by a predetermined signal from control means. The signal contemporaneously releases the first pressure-responsive bias means and also releases the pressure-responsive seal means to open the draining orifice. With the holding force released, and the pressurized fluid drained from the overbalance chamber, the spring bias impels the main plug to the open position.

A hydraulic system absorbs the high impact energies attendant upon the opening of the main valve plug. The draining orifice is a predetermined dimension so that rapid decay of the pressurized fluid from the overbalance chamber is provided, thus avoiding any cyclic force effects, such as fluttering, in the main plug.

An object of the invention is to provide a quick opening valve device for a pressurized fluid line capable of normally closed to wide open operation in response to a predetermined trip signal. It is desirable, and, therefore, a further object of the invention, to provide a valve device able to divert a large volume of high temperature and high pressure steam in a nuclear steam turbine system in a fully controlled manner.

BRIEF DESCRIPTION OF THE DRAWINGS

The invention will be more fully understood from the following detailed description of an illustrative embodiment, taken in connection with the accompanying drawings, in which.

DESCRIPTION OF THE PREFERRED EMBODIMENT

Figure 1:
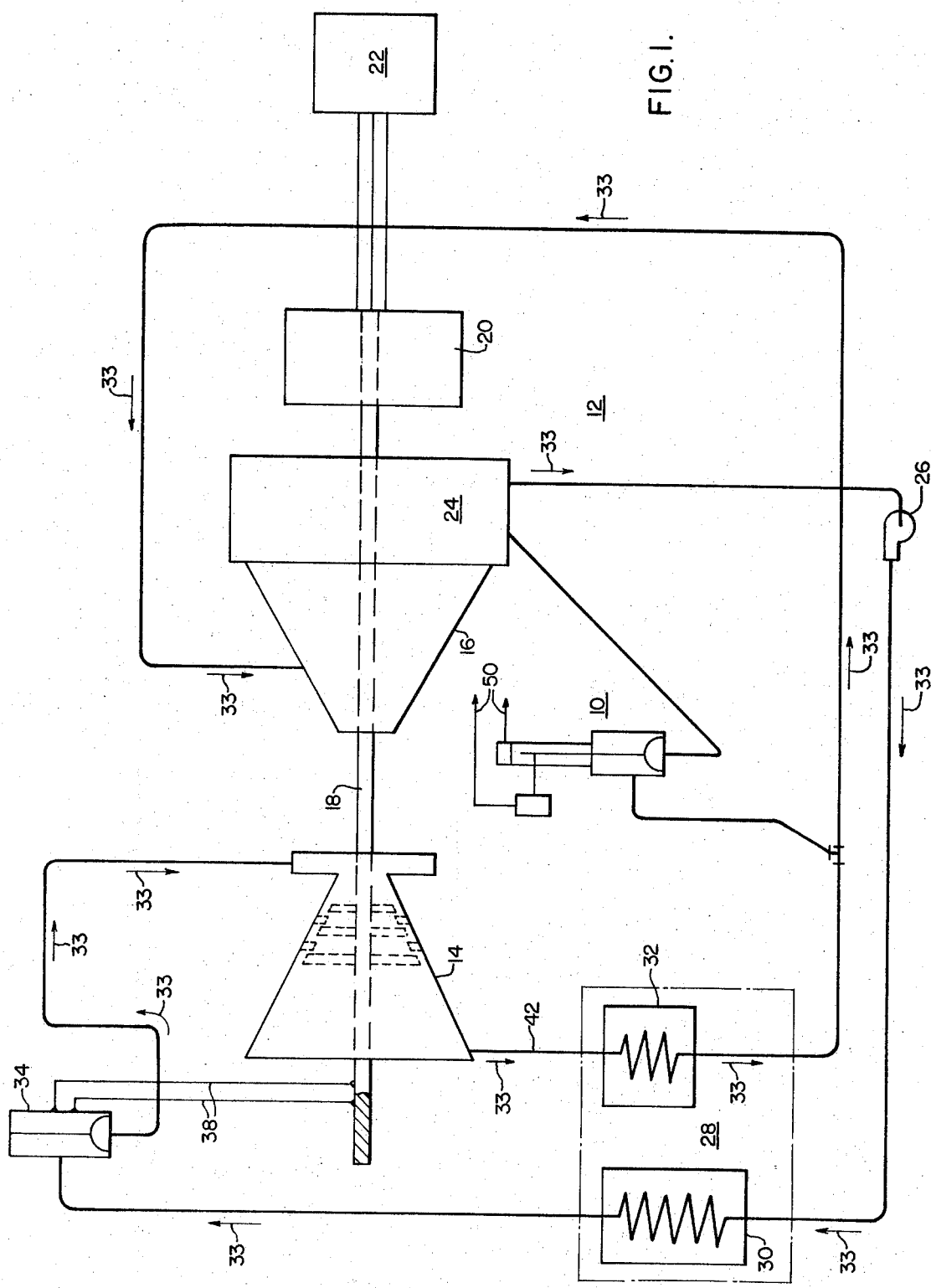
FIG. 1 is a diagrammatic view indicating the location of the steam bypass dump valve in a nuclear steam turbine system.

Throughout the following description, similar reference characters refer to similar elements in all FIGURES of the drawings.

Referring first to FIG. 1, a quick-opening bypass valve 10 constructed according to the teachings of the invention is illustrated as applied to a nuclear steam power plant 12. The nuclear steam power plant 12 has a high pressure turbine section 14 and a low pressure turbine section 16 connected together on a common shaft 18 as shown in the drawing. The shaft 18 mechanically links the turbine sections 14 and 16 to an electrical generator 20 which supplies electrical energy to an associated electrical load 22. The low pressure turbine 16 may exhaust into still lower pressure turbines, or directly into a condenser 24. The condenser 24 produces a condensate which is returned by a boiler feed pump 26 to a steam generator 28, in this case a nuclear steam generator. The steam generator 28 has a primary steam generator section 30 and a reheater section 32.

The path of the compressible or elastic fluid in the turbine illustrated by arrows 33 is from the boiler feed pump 26 to the primary heater coils 30, then through a main turbine control valve 34, to the high pressure turbine elements 14 and back to the reheater 32. Steam discharged from the reheater 32 passes to the inlet of the low pressure turbine 16. This simple flow path does not include many conventional elements of steam power plants as these other elements have been omitted for clarity, but are well-known to those skilled in the art.

The main control valve 34 is controlled by a turbine control system (not shown) which is connected to the main control valve by leads 38. The control system has, as its primary function, closing the main control valve 34 in response to any one of a variety of system failures, such as sudden loss of electrical load 22 or failure of an essential turbine service, which require shutdown of the power plant 12.

When the main control valve 34 is closed, a large volume of steam at a high pressure and temperature is trapped in the high pressure turbine 14, the reheater 32, the conduit 42 between the high pressure turbine 14 and the reheater 32. This entrapped steam, if permitted to expand through the low pressure turbine elements 16, would convert the heat energy carried by the steam into rotational energy. An increase in the overspeed condition would follow this energy conversion and induce mechanical stresses on the blading and associated components in the high pressure turbine 14 and low pressure turbine 16. If the overspeed condition were aggravated, mechanical failure of the turbine blading would likely result.

The steam bypass valve 10, constructed according to the teachings of this invention, is disposed between the reheater section 32 and the condenser 24. The valve 10 is normally closed to prevent steam from bypassing the low pressure turbine elements 16 during normal turbine operation. The valve 10 is connected to the turbine control system (not shown) as indicated at 50. The quick-opening response mode of the steam bypass valve to a predetermined signal from the control system will be discussed more fully herein.

In FIG. 1, the opening of the bypass valve 10 provides a flow path to the condenser 24 for the steam trapped in the high pressure turbine 14, the reheater 32, and the conduit 42 therebetween. The bypass valve 10 is a quick-opening valve capable of diverting a large volume of the high pressure and high temperature steam from the reheater 32 directly into the condenser 24. By providing a bypass route around the low pressure turbine elements 16 and provision of the quick-opening valve 10 in the bypass route, a large volume of entrapped steam is not permitted to expand through the low pressure turbine 16, thus preventing aggravation of the overspeed condition and avoiding the possibility of premature turbine failure caused by increased mechanical stresses.

Figure 2:
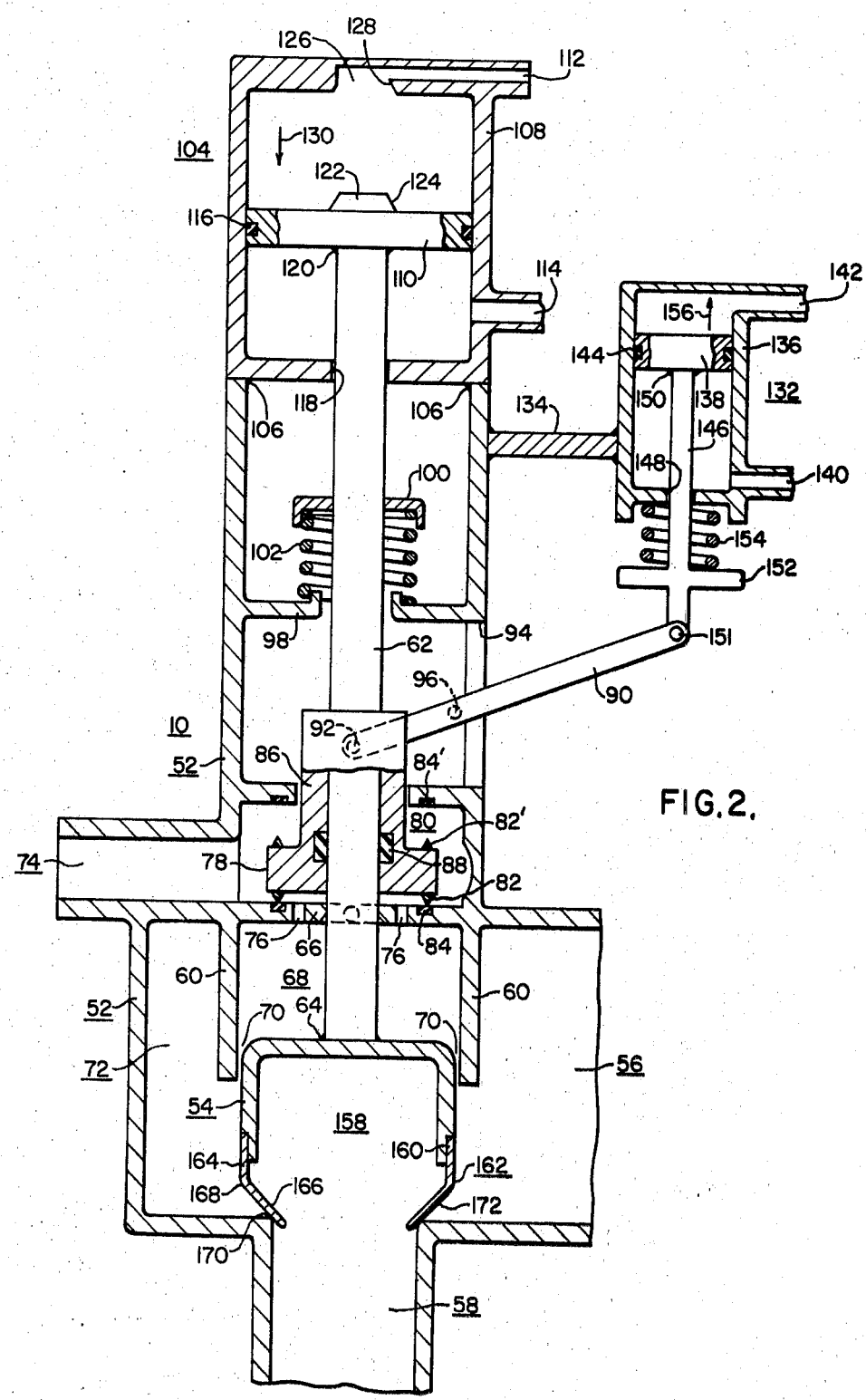
FIG. 2 is an elevational view, entirely in section, illustrating the steam dump valve in the closed position.

Referring now to FIG. 2, an elevational view, entirely in section, of the bypass valve 10 constructed according to the teachings of this invention is illustrated. The valve 10 is disposed in the pressurized fluid line between the reheater section 32 and the condenser 24 (FIG. 1).

The valve 10 is comprised of a main valve body member 52 and a main valve plug 54 movably disposed within the body member 52. The body member 52 is fabricated of a strong durable steel alloy. The main plug member 54 is movable from closed position, illustrated in FIG. 2, to a wide open position shown in FIG. 5. The body member 52 has disposed therein an inlet port 56 and an outlet port 58. When closed, the main plug isolates the inlet port 56 from the outlet port 58, thus blocking passage of fluid through the valve 10.

The main plug 54 is guided by a substantially cylindrical plug guide 60 disposed within the body 52. A valve stem 62 is attached to the main valve plug 54 by suitable means 64. The stem 62 extends axially through the interior of the body 52 and is guided by a stem guide 66 which is integral with the body member 52.

An overbalance chamber 68 is defined by the interior of the body 52 and the main valve plug 54. The overbalance chamber 68 communicates with the inlet port 56 through a narrow clearance channel 70 which extends between the main valve plug 54 and the plug guide 60. A main body cavity 72 is disposed within the body 52 and surrounds the main plug 54. The geometry of the valve 10 provides a self-draining valve assembly.

Figure 5:
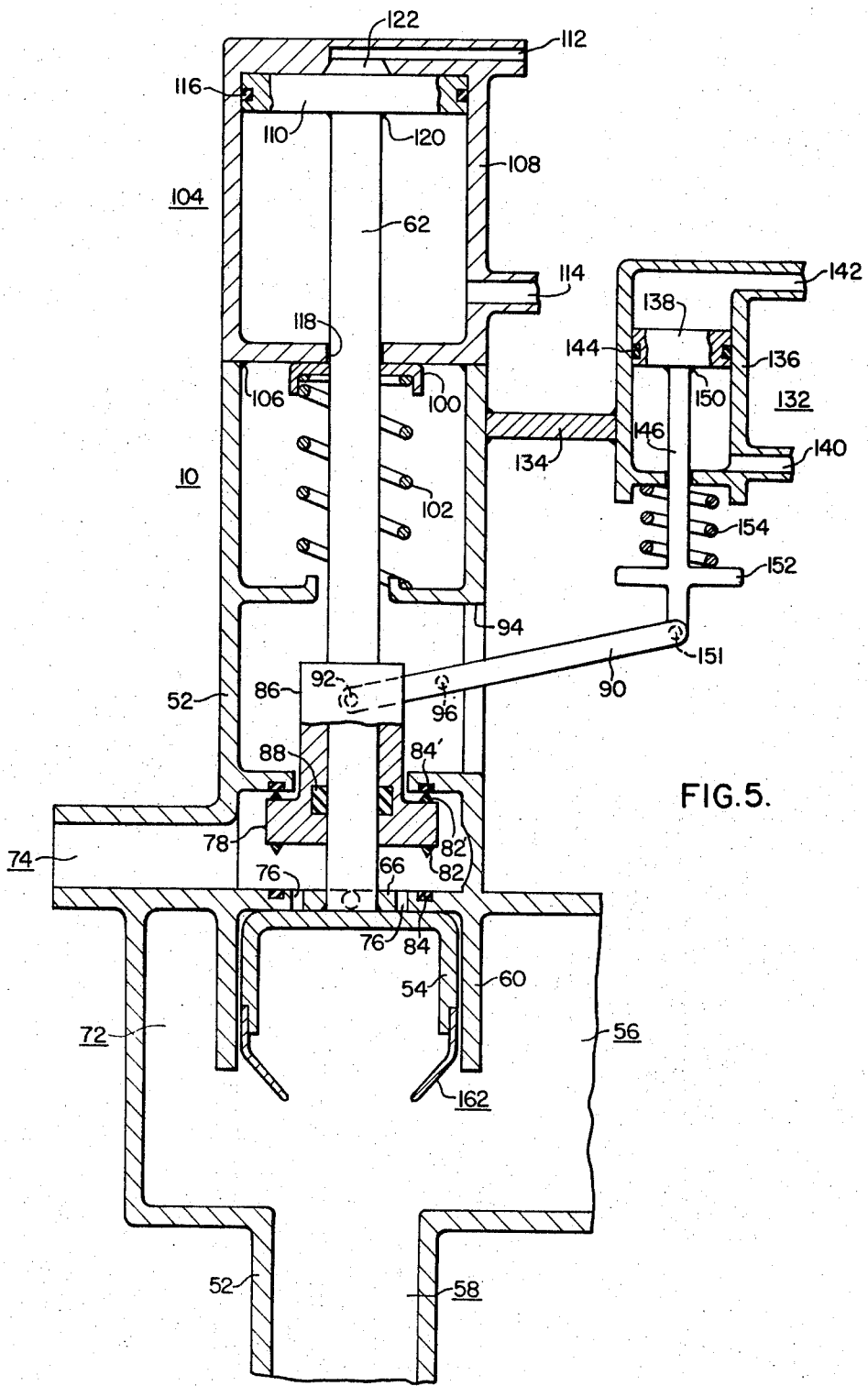
FIG. 5 is an elevational view showing the steam dump valve in the open position.

The overbalance chamber 68 communicates with a steam dump line 74 connected to the body member 52 through a draining orifice 76. A pilot plug 78 is movably disposed within a pilot cavity 80 defined within the body 52. The pilot plug 78 is movable between a closed position (FIG. 2) and an open position (FIG. 5). When the pilot plug 78 occupies the closed position, the pilot plug 78 blocks the draining orifice 76, thus isolating the overbalance chamber 68 from the steam dump line 74. Positive sealing for the closed pilot plug 78 is provided by a first pilot plug ring 82 disposed on the pilot plug 78 and a first pilot plug seat ring 84 disposed in the body 52. In the open position of the pilot plug 78, a second pilot plug ring 82' and a second pilot plug seat ring 84' provide positive sealing, the making the valve 10 virtually internally leak proof.

The pilot plug 78 has a cylindrical sleeve portion 86 which coaxially surrounds a portion of the stem 62. The sleeve 86 can be moved independently of the stem 62. An O-ring 88 surrounds the stem 62 to provide a seal between the sleeve 86 and the stem 62.

A linkage rod 90 is pivotally attached to the sleeve 86 by a pin 92. The linkage rod 90 extends through an opening 94 in the body 52 and is pivotally mounted adjacent the opening 94 on a pin 96.

The pilot plug 78 is closed when the main plug 54 is closed. It is thus seen that while the pilot plug 78 and the main plug 54 are closed, the overbalance chamber 68 if filled with fluid from the pressurized line inlet 56 through the clearance space 70. Since the overbalance chamber 68 is isolated from the dump line 74, the fluid accumulates in the overbalance chamber 68, and exerts a useful force on the main plug 54, the force acting in a direction tending to hold the main plug 54 in a closed position.

Although the arrangement of the pilot plug 78 in FIG. 2 discloses a coaxial arrangement between the sleeve 86 and the stem 62, it is to be understood that any configuration whereby the pilot plug 78 is disposed so as to isolate the overbalance chamber 68 from the steam dump line 74 is within the contemplation of this invention.

A ledge 98 extends around the interior of the body 54. A spring retainer 100 is attached to the stem 62. A bias spring 102 is disposed between the ledge 98 and the spring retainer 100. The spring 102 exerts a force on the stem 62 which tends to move the main plug 54 toward the open position.

Referring now to the top most portion of the valve 10 as seen in FIG. 2, a hydraulic actuator assembly 104 is attached to the body 52 by suitable means 106. The hydraulic actuator assembly 104 comprises a pressure tight cylinder 108 having a piston 110 movably disposed therein. A hydraulic fluid is disposed within the cylinder 108, the fluid entering the cylinder from a reservoir (not shown) through an opening 112 located near the top of the cylinder 108. The hydraulic fluid can drain from the cylinder 108 through a drain 114 adjacent the connection of the hydraulic actuator 104 and the body 52. An O-ring 116 surrounds the piston 110 and maintains a sealed relationship between the piston 110 and the interior side-walls of the piston 108.

The stem 62 extends through an opening 118 in the cylinder 108 and is attached to the underside of the piston 110 by suitable means 120. A snubber 122 is disposed on the piston 110 as shown in FIG. 2. The snubber 122 has a frustoconical surface 124 thereon. The top cover of the cylinder 108 has an orifice 126 therein, the orifice 126 having a frustoconical surface 128 which engages the frustoconical surface 124 of the snubber 122. The snubber 122 and orifice 126 acts as a damper assembly which absorbs the high impact energies which occur when the valve 10 trips open.

The piston 110 responds to an increase in pressure within the cylinder 108 by moving in a direction indicated by an arrow 130. Movement of the piston 110 in the direction 130 exerts a force on the main plug 54 which overcomes the force exerted by the spring 102 to move the main valve plug to the closed position illustrated in FIG. 2.

The pilot plug 78 is controlled by a separate pilot actuator 132. Although the embodiment shown in FIG. 2 discloses the pilot actuator 132 as mounted on the body 52 by a support 134, it is to be understood that the pilot actuator 132 need not be so affixed.

The pilot actuator 132 comprises a pressure tight cylinder 136 having a piston 138 movably disposed therein. A hydraulic fluid completely fills the cylinder 136, the fluid entering the cylinder 136 through an opening 140, while a drain 142 conducts the fluid back to the reservoir (not shown). An O-ring 144 surrounds the piston 138 and seals the piston 138 against the interior of the cylinder 136. A piston rod 146 extends through an opening 148 in the cylinder 136. The piston rod 146 is attached to the underside of the piston 138 by suitable means 150. The piston rod 146 is pivotally attached to the linking rod 90 by a pin 151. A spring retainer 152 is disposed on the piston rod 146. A spring 154 is disposed between the underside of the cylinder 136 and the spring retainer 152.

The spring 154 exerts a force on the pilot plug 78 which tends to move the pilot plug 78 from the closed position shown in FIG. 2 toward the open position (FIG. 5) in which the draining orifice 76 is unblocked. The piston 138 responds to an increase in pressure within the cylinder 136 by moving in a direction opposed to the direction of the force exerted by spring 154. An arrow 156 indicates the direction of movement of the piston 138. The turbine control (not shown) causes the pressure to increase within the cylinder 136.

It is thus seen that by simultaneously increasing the pressure within the cylinder 108 and the cylinder 136, the turbine control means (not shown) can move the main plug 54 and, at the same time move the pilot plug 78 toward the closed position shown in FIG. 2. The piston 110 moves against the force exerted by the spring bias 102 while the piston 138 moves against the force exerted by the spring bias 154.

When the main valve plug 54 is closed, the fluid from the inlet port 56 collects in the overbalance chamber 68, causing the pressure in the overbalance chamber 68 to increase, thus exerting a force which assists the force exerted by the main actuator 104 to hold the main valve plug 54 in the closed position.

Referring again to the main valve plug 54, the plug 54 is a substantially cup-shaped member defining an unbalance chamber 158 on the interior of the main plug 54. The main plug 54 has a notch 160 extending circumferentially about the exterior of the main plug 54 adjacent the rim of the main plug 54.

A flexible metallic seat 162 is disposed in the notch 160. The flexible metallic seat has a substantially cylindrical portion 164 and a frustoconical portion 166 connected by a rounded transition portion 168. The rounded transition portion 168 prevents excessive stresses from concentrating at the transition portion and prevents damage to the metallic seat 162.

When the plug 54 occupies the closed position shown in FIG. 2, the frustoconical portion 166 of the seat 162 abuts the body 52 adjacent the outlet port 58, as illustrated by 170. The metallic seat 162 is deflected by the downward force on the main plug 54. This deflection in the flexible mechanical seat 162 insures a positive seal will obtain at the point of abutment 170. Since the seat 162 is deflected, any thermal expansion of the valve body 52 due to excessive thermal gradient between the inlet and outlet temperatures will not disrupt the seal 170. In addition, the deflection of the seat 162 provides a useful force which helps in opening the valve plug 54, as will be explained more fully herein.

The seat 162 is exposed, over a portion thereof, to the force exerted by the pressurized fluid at the inlet port 56, as indicated at 172. This force on the seat 162 also assists the movement of the plug 54 to the open position, in a manner more fully discussed in connection with FIG. 3.

Since the flexible seat 162 provides the positive sealing between the valve plug 54 and the body member 52, the conventional sealing rings and valve seats are eliminated, thus reducing friction levels in the valve 10 to a minimum level.

Since the intended application of the valve 10 is to bypass steam around the low pressure turbine elements 16 to the condenser 24 (FIG. 1), the valve 10 will be normally closed. Before the plant 12 is put into initial operation, a primer jet will evacuate the condenser 24, and, with the valve 10 open, a vacuum condition will exist throughout the system, with the pilot plug 78 in the open position.

Actuation of the pilot actuator 132 by the turbine control will cause the pressure in the cylinder 136 to increase. As the pressure underneath the piston 138 increases, the piston 138 will move in the direction 156 against the force exerted by the bias spring 154. The movement of the piston 138 will move pilot plug 78 from the open position to the closed position (FIG. 2) and will isolate the overbalance chamber 68 from the steam dump line 74.

Substantially coincident with this occurrence the valve hydraulic actuator 104 will undergo an increase in pressure within the cylinder 108, causing the piston 110 to respond to the increased pressure by moving in the direction 130 against the spring 102. The main valve plug 54 will then be seated, with the force of the hydraulic actuator 104 providing the force to hold the main valve 54 seated and sealed. The pilot plug will remain seated and sealed due to force exerted by the pilot plug actuator 132. At this point the steam pressure side of the valve 10, at the inlet port 56 will be isolated from the outlet 58 by seated flexible seat 162.

As the turbine 14 is then pressurized and normal operation begins, steam pressure will be distributed around the main plug 54 in the main cavity 72. The steam will accumulate in the sealed and isolated overbalance chamber 68 through the clearances 70. The accumulation of pressurized fluid in the overbalance chamber will exert an additional force on the main plug 54 which assists in holding the main plug 54 closed.

The metallic seat 162 will be exposed to the pressure of the inlet steam, as indicated at 172, and the deflection of the seat 162 will produce another force tending to open the valve. However, during normal operation, the resultant force in the valve is a net downward force on the main plug 54. The force of the hydraulic actuator 104 and the force due to the accumulation of the fluid in the overbalance chamber 68 will keep the plug seated against the combined opening forces exerted by the spring 102, the deflection in the seat 162, and the force of the steam on the exposed portion 72 of the metallic seat 162.

Once the power plant 12 is in operation, the happening of any one of a variety of occurrences will require a steam bypass in order to avoid the consequences attendant on turbine overspeed.

The fast opening of the valve 10 is accomplished as follows. Loss of the pressure in the hydraulic actuator 104 and the pilot actuator 132, both occurring on a predetermined signal from the turbine control means, will open the main valve plug 54 rapidly. The predetermined signal from the turbine control system will depressurize the pilot actuator 132, thus allowing the bias spring 154 to become dominant and open the pilot plug 78, thus reestablishing communication between the overbalance chamber 68 and the steam dump line 74. The signal from the turbine control will also release the force on the piston 110 in the valve hydraulic actuator 104.

With the pilot plug 78 in the open position, the accumulation of fluid in the overbalance chamber 68 will vent to the steam dump line 74. The upward force of the spring 102, the upward force due to the deflection of the flexible seat 102, and the force of the influent fluid on the flexible seat 162 will combine to move the main plug 54 toward the open position.

By judicious sizing of the draining orifice 76, the pressurized fluid build-up in the overbalance chamber 68 will drain rapidly to the steam dump line 74, thus preventing any flutter of the main valve 54. Fluttering of a valve usually occurs where there is a variation in the rate of decay of two pressurized fluid concentrations on each side of the valve. In this case, the rate of decay of the pressurized fluid from the inlet port 56 to the outlet port 58 is faster than the rate of decay of the pressurized fluid from the overbalance chamber 68. As a result, the pressure in the overbalance chamber 68 above the opening valve plug 54 will momentarily exert a force on the valve plug 54 which will be greater than force tending to open the plug 54. This momentary force on the valve plug 54 will cause a flutter to occur, which diminishes the efficiency of the bypass function of the valve 10. However, this flutter effect can be avoided by predetermined sizing of the draining orifice.

Figure 3:
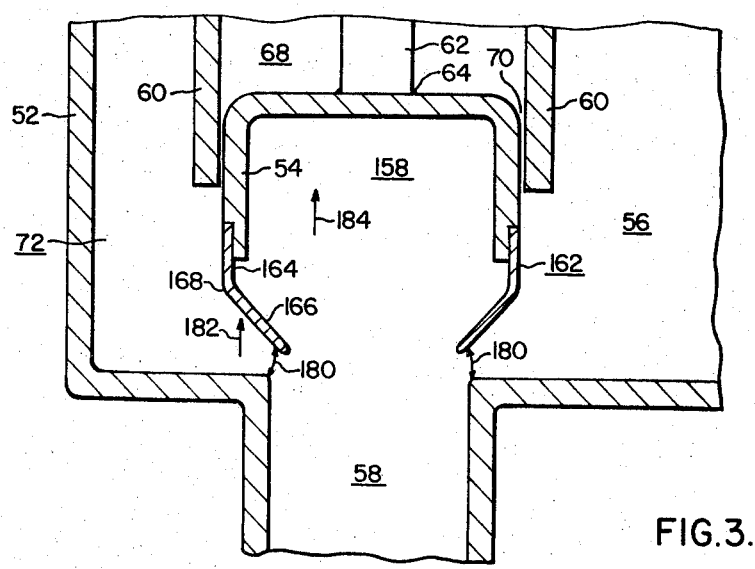
FIG. 3 is a detailed view, entirely in section, illustrating the main valve plug just after the plug member has opened.

Immediately after the main valve plug 54 is opened, a flow between the high pressure fluid at the inlet port 56 toward the lower pressure outlet port 58 is established. The flexible metallic seat 162 is sloped to assist the favorable flow (FIG. 3). Due to the large pressure differences and a nozzle 180 provided by the shape of mechanical seat 162, there is a force 182 acting upward on the valve plug 54 which assists the plug 54 toward the open position.

In addition, the unbalance chamber 158 is, immediately after opening, at the same low pressure existing in the valve outlet 58. The unbalance chamber 158 acts as an expansion volume. As the steam flows into the outlet port 58 the steam will expand into the unbalance chamber 158. The increase in steam pressure in the unbalance chamber 158 creates an upward force 184 which assists the valve toward the open position.

The mechanical spring 102 is sufficient to support the main plug 54 in the open position, despite a diminishing steam pressure force, thus ensuring maximum effectiveness of the bypass function of the valve 10.

Figure 4:
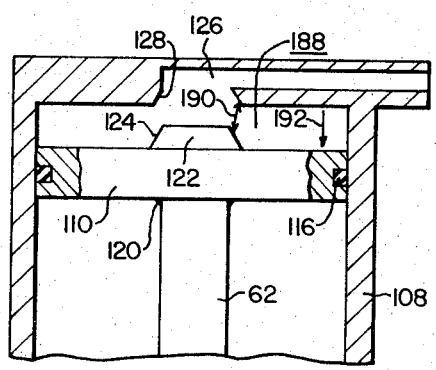
FIG. 4 is a detailed view, entirely in section, illustrating an energy absorbing damper used in the invention.

Referring now to FIG. 4, a detailed view of the hydraulic actuator 104 as an energy absorbing dashpot is shown.

As the piston 110 moves toward the orifice 126, some of the hydraulic fluid within the cylinder 108 will be trapped in a volume 188 between the top of the piston 110 and the top of the cylinder 108. This fluid will be trapped in volume 188 because the frustoconical surfaces 124 and 128 will define a narrow gap 190, and, as a result, all of the fluid between the top of the piston and cylinder wall cannot escape. This entrapped fluid in the volume 188 will act as a dashpot and will exert a force in the direction 192 on the piston 110.

Thus, at the end of the upward opening stroke, the dynamic forces due to the quick opening response of the valve will be dissipated by the snubber dashpot.

The spring 102 will provide the necessary force to hold the main valve plug 54 open during the bypass operation. Thus, maximum benefit will be gained and greatest volume of fluid will bypass the low pressure turbine elements 14. The valve plug 54 will remain open until the hydraulic actuator 104 and pilot actuator 132 are repressurized by the turbine control, thus reestablishing a downward force to close the main valve plug 54.

Referring now to FIG. 5, a view similar to FIG. 2, illustrates the valve 10 in the open position. In this position, the inlet port 56 communicates with the outlet port 58 to provide an efficient bypass route from the high pressure turbine 14 to the condenser 24 (FIG. 1).

the main valve plug 54 is opened, and the piston 110 in the valve hydraulic actuator 104 abuts the top of the cylinder 108. The pilot plug 78 is also open with the second pilot plug ring 82' seated against the second pilot seat ring 84'. The spring 102 exerts a force sufficient to maintain the valve plug 54 in the open position, thus maximizing the effectiveness of the bypass valve 10.

It is thus seen that the valve hereinbefore described provides a quick-opening, steam bypass valve capable of diverting large volumes of pressurized fluid from the outlet of a high pressure turbine into a condenser, thus bypassing the low turbine elements of the system. The bypass valve is a quick opening valve for movement from a normally closed to a wide open position, and responds to predetermined turbine control signals in a fully controlled manner. The valve uses hydraulic pressure force as the basic means of actuation in conjunction with a steam force controlled by an external hydraulic mechanical system. The valve provides a means of absorbing the high impact energy levels when the valve is opened. It also provides, through a flexible metallic seat, a positive sealing, low friction device and features a self-draining geometry. The valve also minimizes any cyclic force effects by a judicious sizing of the draining orifice between the steam dump line and the overbalance chamber.

What is claimed is:

1. A valve for a pressurized fluid line comprising:
   a body member having an inlet port, an outlet port, and an overbalance chamber therein, said overbalance chamber having a draining orifice therein, said overbalance chamber communicating with said inlet port,
   a main valve plug movable from a closed position to an open position;
   means for sealing said draining orifice, said sealing means being movable from a closed position to an open position, said sealing means being closed while said main valve plug is closed, said sealing means in the closed position permitting the pressure of the influent fluid to increase to a predetermined value within said over-balance chamber;
   first bias means for moving said main valve plug to the closed position, said first bias means cooperating with said pressurized fluid in said overbalance chamber to hold said main valve plug closed;
   second bias means for biasing said main valve plug toward the open position;
   means for controlling said first bias means and said sealing means, said control means opening said sealing means to drain said overbalance chamber, said control means releasing said first bias means substantially coincident with the opening of said sealing means, the draining of said overbalance chamber and the release of said first bias means permitting the second bias means to open said main valve plug.

2. The valve of claim 1, wherein said main valve plug has a flexible seat thereon, said flexible seat abutting said body member adjacent said outlet port while said main valve plug is closed, said flexible seat being deflected while said main valve plus is closed, the deflection of said flexible seat producing a force which cooperates with said second bias means to move said main valve plug toward the open position.

3. The valve of claim 1, wherein said main valve plug has a flexible seat thereon, a portion of said flexible seat exposed to the pressure of the influent fluid at the inlet port while said main valve plug is closed, the influent said pressurized fluid producing a first force on said flexible seat which cooperates with said second bias means to move said main valve plug toward the opened position.

4. The valve of claim 3, wherein said main valve plug has a flexible seat thereon, said flexible seat abutting said body member adjacent said outlet port when said main valve plug is closed, said flexible seat being deflected while said main valve plug is closed, the deflection of said flexible seat producing a second force which cooperates with said first force produced by said pressurized fluid on said exposed portion of said flexible seat, said first force and said second force combining to cooperate with said second bias means to move said main valve plug toward the open position.

5. The valve of claim 1, wherein said body member has a steam dump line connected thereto, said draining orifice being disposed between said overbalance chamber and said steam dump line, said closed sealing means isolating said steam dump line from said overbalance chamber, opening of said sealing means permitting said pressurized fluid in said overbalance chamber to vent through said steam dump line.

6. The valve of claim 1, wherein said first bias means comprises a pressure tight cylinder, a piston movably disposed within said cylinder, said piston being connected to said main valve plug, said piston responding to a predetermined pressure within said cylinder by closing said main valve plug.

7. The valve of claim 1, wherein said sealing means comprise a pressure tight cylinder, a piston movably disposed within said cylinder, a sealing pilot plug attached to said piston, and means for biasing said sealing pilot plug toward the open position, said piston responding to an increase in pressure within said cylinder by closing said sealing pilot plug.

8. The valve of claim 1, wherein
said first bias means comprises a first pressure tight cylinder, a first piston movably disposed within said first cylinder, said first piston being connected to said main valve plug, said first piston responding to a first predetermined pressure within said first cylinder by closing said main valve plug;
said second bias means comprises a main spring;
said sealing means comprising a second pressure tight cylinder, a second piston movably disposed within said second cylinder, a sealing pilot plug attached to said second piston and a second spring biasing said sealing pilot plug towards the open position, said second piston responding to a second predetermined pressure within said second cylinder by closing said sealing pilot plug,
said control means opening said sealing means by decreasing the pressure within said second cylinder to permit said second bias spring to open said sealing pilot plug, said control means releasing said first bias means by decreasing the pressure within said first cylinder, the opening of said sealing pilot plug and release of said first bias means permitting said main spring to open said main valve plug.

9. The valve of claim 1, further comprising impact-absorbing means for absorbing the force generated by movement of said main valve plug towards the open position.

10. The valve of claim 2, wherein said main valve plug is a substantially hollow member defining an unbalance chamber within said hollow main valve plug, said unbalance chamber communicating with said outlet port when said main valve plug is closed.

* * * * *